United States Patent [19]
Cohly et al.

[11] 3,821,439
[45] June 28, 1974

[54] COAGULATING AND HARDENING BATH FOR EDIBLE COLLAGEN SAUSAGE CASINGS

[75] Inventors: Mauj A. Cohly, Danville, Ill.; A. F. Turbak, Convent Station, N.J.

[73] Assignee: Tee-Pak, Inc., Chicago, Ill.

[22] Filed: Feb. 20, 1973

[21] Appl. No.: 333,828

[52] U.S. Cl................... 426/277, 426/105, 426/140
[51] Int. Cl............................................. A22c 13/00
[58] Field of Search...... 99/175, 176; 426/105, 135, 426/138, 140, 250, 276, 277

[56] References Cited
UNITED STATES PATENTS
3,533,809   10/1970   Cohly et al. .......................... 99/176

*Primary Examiner*—Hyman Lord
*Attorney, Agent, or Firm*—Russell L. Brewer; Neal J. Mosely

[57] ABSTRACT

An improved process for coagulating and hardening an aqueous collagen slurry for the manufacture of edible collagen casings comprises extruding the slurry into an aqueous solution having a pH of from about 8 – 11 and containing at least about 5% by weight of an alkali metal salt of strong acid, e.g., sodium sulfate, and from about 1 percent by weight of an alkali metal salt of a weak acid, e.g., sodium carbonate, for a time sufficient to effect substantial precipitation, dehydration, and neutralization of the gel collagen to form casing film having a high rewet strength.

7 Claims, No Drawings

COAGULATING AND HARDENING BATH FOR EDIBLE COLLAGEN SAUSAGE CASINGS

FIELD OF THE INVENTION

This invention relates to new and useful improvements in the manufacture of artificial sausage casings, and more particularly, to the production of artificial sausage casings from animal hide collagen.

BACKGROUND OF THE INVENTION

Natural casings prepared from the intestines of edible animals, primarily cattle, swine, and sheep have been extensively used as casings for edible meat emulsions, e.g., sausage and frankfurters. Because of the expense and limited supply of natural casings for sausage processing, synthetic casings were developed as a substitute for the natural casings. Regenerated cellulose casings were developed for processing frankfurters and the like. One of the disadvantages of this casing material for sausages is that it is not edible and it does not transmit fat during cooking.

Over a period of years, edible synthetic sausage casings have been prepared from animal collagen. These casings have been prepared by processing animal hides to break the collagen obtained therefrom into a fibrous structure and then extrude the collagen fibers into a form of a doughy mass for producing tubular casings. In the preparation of edible collagen casings, the animal hide collagen is converted into a finely divided, fibrillar form. This is done by contacting finely ground collagen with weak organic acid such as lactic acid and allowing the collagen to swell into a paste or slurry. The slurry is homogenized, usually in a two-stage homogenizer and then extruded through an annular die as a tubular gel casing. The gel casing passes into a coagulating bath which dehydrates the gel collagen tube and forms a coherent collagen film. Although the coagulated collagen film can be handled after coagulation, it reverts to a thin slurry on contact with water. Therefore, it has been necessary to harden or tan the coagulated collagen film to permit further processing of the film, particularly washing and drying. After tanning, the casing is washed, dryed, and wound on a wheel for storage until use.

DESCRIPTION OF THE PRIOR ART

This invention is directed to the coagulating and hardening of edible collagen casing. In the past, it has been common practice to coagulate gel collagen casing by contacting the casing with an aqueous bath comprising ammonia and ammonium sulfate, having a pH of from about 8 – 11. This bath effectively coagulates the slurry and neutralizes the acid in the film. However, one of the disadvantages of this particular bath is the presence of noxious ammonia fumes which are dangerous to operating personnel. Although it is possible to use enclosed systems, much effort must be expended to insure that the system is substantially enclosed and seals are maintained. Additionally, such systems often require substantial maintenance.

Another method for effecting coagulation has been the use of an aqueous bath consisting of a combination of ammonium sulfate and caustic soda having a pH of about 8 – 10. However, caustic soda on contact with ammonium sulfate forms ammonia and sodium sulfate under basic conditions and again the same odorous problems associated with the ammonium sulfate-ammonia baths occur.

It has also been suggested to use an aqueous coagulating bath comprising sodium sulfate and caustic soda for coagulation of the collagen slurry to a coherent collagen film. However, one of the disadvantages with this particular bath is that the proportion of caustic soda used to neutralize the acid imparts a high pH, e.g., 13 and above. The high pH in the coagulating solution tends to "case harden" the sausage casings. Case hardening refers to the hardening of the outer surfaces of the casing, leaving the inner portion in a gel state. Case hardening occurs most frequently in larger and thicker casings. Secondly, the high pH has a tendency to effect undesirable swelling of the collagen film.

It has also been suggested to neutralize acid in casing by passing ammonia through the tubular casing in sufficient amounts to neutralize the acid. However, this process has the disadvantage of other processes described in that noxious ammonia fumes are present.

SUMMARY OF THE INVENTION

An improved process for the coagulating and hardening of gel collagen tubular casing has been found. The process is advantageous for the production of small edible casings and of large diameter tubular casing having thick walls which are coagulated and neutralized without the usual "case hardening" of the film. Additionally, and more importantly, the process has the added advantage in that the casing need not be tanned as is necessary with the other processes. On the other hand, the casing may be tanned if desired.

The improvement comprises coagulating and neutralizing an aqueous collagen slurry in an aqueous bath having a pH from about 8.5 to about 11, comprising an alkali metal salt of a weak acid and an alkali metal sulfate salt of a strong acid, e.g., sulfuric for forming a coherent film.

The alkali metal salt of a weak acid in the bath performs a twofold function. It acts as a buffer and neutralizes the acid in the casing, forming an alkali metal salt and an acid. One of the requirements of the alkali metal salt is that it forms an acid which is fugitive. In the case of alkali metal bicarbonates and carbonates, carbonic acid formed which is fugitive and undergoes decomposition forming carbon dioxide and water. Another requirement is that the alkali metal salts have sufficient basicity to neutralize the acid in the casing by maintaining the pH above about 8 and below about 11. This pH range substantially eliminates the possibility of case hardening.

DESCRIPTION OF THE PREFERRED EMBODIMENT

The collagen tissues which are suitable for preparation of collagen casings are obtainable from animal hides, bovine hides being preferred. Recent patents have described the necessity of using unlimed animal hides as the source material as the liming allegedly prevents the release of collagen fibrils necessary for the fibrillar films. However, more recently the casings can be made from either the limed or unlimed hides as well as from frozen, unfrozen, salt cured, or fresh hides.

The proportion of alkali metal salt of an inorganic acid useful for making the aqueous coagulating bath is from about 5 to 25 percent by weight or amounts equivalent to those of saturated solutions at temperatures not exceeding about 35°C. Temperatures exceeding about 35°C, although allowing more alkali metal salts to be carried in the bath, are generally detrimental to the collagen films and effect decomposition thereof. Thus, any salts which would be carried at temperatures of 35°C would be precipitated at coagulation temperatures. Proportions of alkali metal salts lower than about 5 percent are not preferred as there is not sufficient salt to effect desirable coagulation of the collagen on extrusion of the collagen slurry. Preferably, about 10 – 15 percent of alkali metal salts is used to achieve desired coagulation.

The alkali metal salts of inorganic acids are those of the metals of Group 1 of the periodic table. However, for reasons of efficiency and economy, sodium and potassium are the preferred alkali metals and of these sodium is preferred. However, both are extremely effective in the coagulation of collagen casing.

Typically, the strong acids are selected from the group consisting of nitric, sulfuric, and hydrochloric. Of these, sulfuric acid is preferred. The preferred salts are nitrates, sulfates, and chlorides of alkali metals. As a result of such high acid activity, the salts in water are substantially neutral.

The aqueous coagulating bath should contain from about 15 percent by weight of alkali metal salt of a weak acid, e.g., carbonic. Such salts typically comprise the carbonates, bicarbonates, and sesquicarbonates. Useful in conjunction with the alkali metal carbonates are the alkali metal bicarbonates and some systems comprise from about 3 – 8 percent bicarbonate by weight of the alkali metal carbonate. The carbonate salt form is preferred to the bicarbonate as there is the ability to neutralize larger proportions of acid in the collagen film with a lower weight of salt in the bath.

The amount of alkali metal carbonate necessary to be in the bath for coagulating collagen casing as it is extruded from the annular die is an amount sufficient to neutralize substantially all of the acid in the collagen film. Higher proportions up to saturated solutions are preferred. Proportions below about 1 percent usually are insufficient to neutralize the acid in the casing and to effect coagulation.

The temperature for coagulating the collagen casing is the same used by prior art processes. Generally, this temperature is from about 25° – 35°C. The temperature should not exceed about 35°C for reasons that the collagen begins to decompose at such temperatures to gelatin.

After coagulation, the casing can be washed and then tanned, if desired, by passing the casing through a tanning bath for supplemental hardening. Tanning generally is accomplished by passing the casing through a bath containing a suitable non-toxic tanning agent, e.g., alum, aluminum sulfate, iron salts, glutaraldehyde, etc.

Plasticization of the film can be accomplished by passing the casing through a bath containing a plasticizing agent. Generally, the plasticizing agents are polyhydric alcohols having from about two to 10 carbon atoms in the structure and at least two hydroxyl units therein, not necessarily one hydroxyl unit on each carbon atom. For reasons of efficiency and economy, glycerin is the preferred plasticizing agent.

The following examples are provided to illustrate preferred embodiments of this invention and are not intended to restrict the scope thereof. All parts are parts by weight, all percentages are expressed as weight percentages, and all temperatures are in degrees centigrade.

EXAMPLE I

Collagen Casings Prepared From Limed Animal Hides

The collagen which is used in preparing the edible casing is derived from limed animal hides as is shown in Example I of U.S. Pat. No. 3,533,809 although unlimed hides may be used with appropriate modification of the process.

Selected animal hides from carcasses certified fit for human consumption, weighing about 65 – 75 pounds each, are used as the starting material for this process. As soon as possible after flaying and inspection, the hides are washed in a large volume of circulating cool (10°C) water to remove adhering blood. After washing, the hides are fleshed fresh, without curing, to remove adhering fatty and muscular debris from the flaying operation.

The washed and fleshed hides are then treated in a liming bath containing 6 percent wt. of fresh calcium hydroxide and 1.5 percent wt. of sodium sulfhydrate (the liming bath may contain up to 3 percent dimethylamine sulfate), as solution and/or slurry contained in about 450 percent wt. of water at room temperature (15° – 20°C), all percentages being calculated on the weight of the hide treated. The treatment is carried out for a period of less than 6 hours, sufficient to remove most of the hair from the hide, and the hides are gently agitated from time to time to insure even penetration of the liming liquor.

After liming, the hides are removed from the liming bath and permitted to drain for a period of about one-half hour while suspended. The limed hides are gently squeezed, as between rubber rollers, to remove excess liming liquor. The hides which have been thus limed, drained and squeezed, are then cut or split in the plane of the hide into two approximately equal portions by weight. The upper or outer hide surface contains all of the hair, hair follicles and sebaceous and sudorific glands. The outer or hair-containing layer or split is unsuitable for use in the preparation of casing but may be used for leather.

The corium layer or split is then placed in a tank or vat containing about 4.5 times the hide weight of water at a temperature less than about 15°C. Gentle agitation is used to insure even removal of debris and adhering lime solution and/or slurry. The hides are washed during a period of 20 – 30 minutes. The washings are removed and the corium splits are resuspended in 4.5 times their weight of cool (15°C) water. Edible grade lactic acid, suitably diluted at a concentration of 2 – 4 ounces of 44 percent lactic acid per quart of cool (15°C) water is added in small portions at 15 minute intervals, with gentle agitation for 5 minutes for each 15 minute period. The liquor is tested for pH before each addition, and end point is regarded at a point when the pH is permanently depressed below 7.0. In general, this requires about 1.5 percent of the 44 percent lactic acid, based on the weight of the corium splits. This treatment is effective to neutralize the excess lime in the corium layer and remove it as a soluble salt. The rate of addition of the lactic acid solution is carefully regulated so that the temperature of the bath is never permitted to rise above 32°C.

The neutralized and delimed corium splits are then removed from the neutralization bath, drained and rinsed in cool (15°C) water, packed into polyethylene bags which are in turn placed into 50-gallon fiber drums. Dry ice in sufficient quantity is placed above and below the polyethylene bags to chill the prepared collagen and to maintain it below 5°C during storage and/or shipment prior to comminution and acid swelling operations prior to extrusion. It should be noted, however, that the hides may, if desired, be cut into small pieces or small pieces of scrap hide material may be used in the steps of liming, splitting, and neutralization or deliming.

The delimed corium splits are cut into small square or rectangular sections, e.g., one-fourth to 4 inches on a side, in preparation for grinding. The small pieces of treated hide are converted to a fine pulp by successive passes through a meat grinder. In this grinding operation, sufficient ice is mixed with the hide splits to maintain the temperature below about 20°C (preferably below about 10°C). The successive passes through the meat grinder use successively smaller dies, the smallest being about three sixty-fourths inch. At this point, sufficient water is added to the pump to produce a mixture consisting of about 90 percent water and 10 percent collagen.

The collagen pulp is then treated with sufficient dilute lactic acid (or other dilute or weak acids such as citric or acetic acid may be used) to produce a pH of about 2.5 – 3.7. The acid is usually added as a dilute solution, e.g., about 0.8 – 2.0 percent. After thorough mixing, the pump and acid are stored overnight at a temperature of about 3°C to swell. At the end of this time, the collagen is swollen and has taken up all of the water in the slurry. The swollen collagen is mixed with sufficient water and acid to maintain the pH of 2.5 – 3.7, thus producing a thin homogeneous paste consisting of about 4 percent collagen and 1.2 percent lactic acid.

The swollen collagen slurry is passed through a homogenizer to further disperse the fibers and is then filtered to remove any undispersed fiber clumps or other solid contaminants. The paste is generally deaerated by storage under vacuum prior to extrusion.

In preparing the collagen slurry for extrusion, the acid deliming step described above may be omitted if the initial liming operation is sufficiently short and the entire operation from start of the liming of the hide through the acid swelling of the comminuted collagen is sufficiently short. Thus, if the initial liming of the hide is a relatively short period, e.g., 3 – 12 hours, and the hide is immediately thereafter defleshed, split, washed, cut into small pieces, and comminuted, and if the comminuted collagen is immediately subjected to acid swelling, homogenization, and filtering, as described above, it may be possible to eliminate the deliming step.

The homogenized and filtered collagen slurry then is pumped under pressure through a counter-rotating extrusion die into an aqueous coagulating bath, substantially saturated with sodium sulfate and containing about 5 percent by weight sodium carbonate and about 5 percent by weight sodium bicarbonate. The pH of the coagulating bath is about 9 – 10. The collagen casing is subjected to multi-passes of about 4 – 8 minutes. A coherent film is formed and the acid substantially completely neutralized. This treatment collapses the gel to a very coherent film which does not require tanning.

From the coagulating bath, the casing then is passed into a wash bath where it is maintained for a period of about 10 minutes. The washing step removes substantially all of the water-soluble salts present in the casing. The casing then is passed through a plasticizing bath consisting of about 5 percent by weight glycerin in water. From the plasticizing bath, the casing passes through a dryer where it is inflated with compressed air and dried by circulation of heated air over the surface of the inflated casing. The casing is dried by air maintained at a temperature of 70°C, circulated at a rate of about 200 feet per minute.

The collagen casing processed in this matter possesses a wet process breakload strength of about 600 g and a rewet breakload strength of about 1,000 – 1,200 g. The wet breakload strength is the strength of the casing taken immediately prior to drying. It is always less than the rewet strength which is the strength of the casing taken when the casing is obtained from the dryer, immersed in water, and withdrawn. The rewet strength is important as it gives an approximation of the casings's characteristics during stuffing. The casing of this example and others to follow are extruded through the same die and are of the same size. All measurements are made on a Scott Tester which is commonly used in the industry.

The collagen casing can be shirred without difficulty on a shirring machine of the type used for shirring of regenerated cellulose. The shirred casing can be stuffed, linked, and cooked without difficulty.

EXAMPLE II

Preparation of Edible Collagen Casings from Limed Animal Hides

The procedure for making the homogenized slurry extrudable into casing is the same as the process set forth in Example I.

The slurry is extruded through an annular die into an aqueous bath of saturated sodium sulfate containing about 5 percent by weight sodium carbonate. The bath is maintained at a temperature of about 30 – 35°C and the resulting casing maintained in the bath for a period of about 3 – 6 minutes in order to substantially and 70° neutralize the acid in the collagen. The casing, after immersion in the coagulating bath, is removed and washed for removal of any water-soluble salts present in the casing. The casing usually is maintained in the wash bath for a period of about 10 minutes by means of a multiple pass arrangement. After washing, the casing passes through a plasticizing bath consisting of about 5 percent by weight glycerin in water. From the plasticizing bath, the casing is inflated with compressed air and passed through a tunnel dryer where the casing is dried by circulation of heated air over the surface of the inflated casing. The casing normally is dried by air maintained at a temperature of about 70°C and circulated through the dryer at a rate of about 200 feet per minute.

The wet process breakload strength of the casing is approximately about 700 g. After the casing is dried and removed from the dryer, it is immersed in water and evaluated for strength. This casing has a rewet strength of about 1,200 – 1,400 g. The casing prepared, as described, can be shirred without difficulty using a shirring machine of the type used for shirring of regenerated cellulose casing, and the shirred casing can be stuffed, linked, and cooked without difficulty.

EXAMPLE III

Collagen casings prepared from unlimed animal hides without a tanning step is illustrated. The process for treating a hide source to form a collagen slurry capable of extrusion into casing is the same as in Example VI of U.S. Pat. No. 3,413,130.

The homogenized slurry then is pumped under pressure through an extrusion die (as described above in Example I) into an aqueous coagulating bath substantially saturated with ammonium sulfate, having a pH of approximately 7. The temperature of the bath is maintained at about 20°–25°C. The casing is held in contact with the bath for a period of about 2 – 4 minutes to substantially completely de-swell the casing and to effect precipitation thereof. The collagen casing then is removed from the ammonium sulfate bath and passed into a second aqueous bath containing about 10 percent by weight sodium sulfate and about 7 percent sodium carbonate. The bath has a pH of from 9 – 10 and is maintained at a temperature of from about 25° – 30°C. The collagen casing is maintained in this bath for a period of about 2 – 4 minutes to substantially completely neutralize the acid in the casing. Because the pH of the bath is between about 9 – 10, the acid in the casing is neutralized without case hardening.

From the second coagulating bath, the casing is passed into a wash bath where it is maintained for a period of about 10 minutes by a multi-pass arrangement. The wash bath is essentially water and its function is to remove the water-soluble salts from the casing so as to preclude embrittlement of the casing during drying. After washing, the casing passes through a plasticizing bath consisting of about 5 percent by weight glycerin in water. From the plasticizing bath, the casing passes through a dryer where it is inflated with compressed air and dried by circulation of heated air over the surface of the inflated casing. Drying temperatures are substantially the same as set forth in Example I.

The collagen casing processed in this manner possesses a wet process breakload strength of about 900 g and a rewet breakload strength of about 1,500 g. The collagen casing possesses excellent shirring characteristics and the shirred casing can be stuffed, linked, and cooked without difficulty. The strength of this casing, both in terms of wet strength and rewet breakload strength, is about 30 percent higher than the strengths of the casings in Example I and Example II wherein only one coagulating bath was used.

When potassium carbonate and potassium chloride are used in place of sodium carbonate and sodium sulfate, substantially similar results are obtained.

EXAMPLE IV

A collagen slurry for extrusion is prepared in exactly the same manner as set forth in Example II. This paste is homogenized, filtered to remove any solid contaminants, and deaerated.

The slurry then is pumped under pressure through an extrusion die as described in Example I into an aqueous coagulating bath, substantially saturated with sodium sulfate, and containing about 5 percent sodium bicarbonate. The pH of the bath is about 8 – 8.5. The temperature of the bath is maintained at about 30°–35°C. The collagen casing is maintained in this bath for a period of about 6 minutes by means of multiple passes through the bath so as to substantially completely neutralize the acid in the casing and effect substantial precipitation of the collagen and reaggregate the collagen fibers and fibrils to form a coherent film.

From the coagulating bath, the casing is passed into an aqueous wash bath to remove all water-soluble salts. From the wash bath, the casing is passed into a tanning bath. The tanning bath comprises aluminum sulfate dissolved in de-ionized or softened water, and one-third mole sodium citrate to produce an aluminum salt complex. The aluminum sulfate-citrate complex is treated with sufficient sodium carbonate to render the complex about two-thirds basic. The casing then is passed through the aluminum sulfate bath for tanning, then removed and washed to remove unreacted aluminum salts and water-soluble salts.

The washed casing then is passed into an aqueous solution containing about 0.5 percent glutaraldehyde and maintained at a temperature of about 30° – 35°C for further tanning and then crosslinked under basic conditions. The tanned casing is passed through a plasticizing bath consisting of about 3 percent glycerin in water. After plasticizing, the casing is passed through a dryer and dried as in Example I.

The collagen casing processed in this manner possesses a wet breakload strength of about 1,200 g and a rewet break-load strength of about 2,000 g. The casing also possesses excellent shirring characteristics and can be stuffed, linked, and cooked without difficulty.

EXAMPLE V

A collagen casing is made from a thin, homogeneous slurry prepared by carrying out the same process steps as set forth in Example I.

The resulting slurry then is pumped under pressure through an annular extrusion die into an aqueous coagulating bath substantially saturated with sodium sulfate and containing about 5 percent by weight sodium carbonate and about 5 percent by weight sodium bicarbonate. The pH of the bath is from about 9 – 9.5 and the temperature is maintained at about 30° ± 5°C. The casing is held in contact with this bath for a period of about 6 minutes to substantially completely neutralize the acid in the casing and re-aggregate the collagen fibers and fibrils for effecting substantial precipitation of the collagen forming coherent film. The collagen casing then is removed from the coagulating bath and passed into an aqueous wash bath in order to remove the water-soluble salts present in the casing.

The casing then is passed into a tanning bath consisting of from about 0.01 – 10 percent gluteraldehyde in water, preferably about 0.5 percent gluteraldehyde. The casing then is withdrawn from the gluteraldehyde - water bath and passed into an aqueous wash bath to remove unreacted gluteraldehyde. From the tanning bath, the collagen casing is passed into a plasticizing bath consisting of about 3 percent glycerin in water. From the plasticizing bath, the casing is passed through a dryer under inflated conditions and dried by circulation of heated air over the surface of the inflated casing as in Example I.

The collagen casing possesses a wet process breakload strength of about 800 g and a rewet breakload strength of about 1,600 g. The casing can be shirred without difficulty and the shirred casing can be stuffed, linked, and cooked without difficulty.

EXAMPLE VI

A collagen slurry is prepared in exactly the same manner as set forth in Example II. This slurry is homogenized, filtered to remove any solid contaminates, and deaerated. In order to present comparative data with respect to collagen casings made by the methods set forth in the previous examples, the collagen casing made from this slurry is conducted employing currently used commercial processing steps.

The collagen slurry is pumped under pressure through an extrusion die as described in Example I into an aqueous coagulating bath, substantially saturated with ammonium sulfate and containing about 0.1 percent sodium hydroxide. In this coagulating bath, the acid is neutralized and the casing coagulated to form a coherent film. The tubular casing then is given a slight waterwash to remove ammonium sulfate present on the surface of the casing without washing away the ammonium sulfate in the casing. This slightly washed casing is passed through a second bath containing about 15 percent ammonium sulfate and having an adjusted pH of about 6.5.

Tanning of the extruded and coagulated casing is accomplished by passing the casing into a bath containing about 4 percent ammonium sulfate and about 6 percent alum, complexed with a third mole of citric acid. Casing is withdrawn from the bath and subsequently washed. This tanned casing then is passed into a second alum tanning bath of composition similar to that of the first tanning bath for the purpose of strengthening the casing after the washing step. The casing then is washed with water for removing substantially all ammonium sulfate. The tubular casing then is passed through a tanning bath containing from about 0.01 percent – 0.1 percent gluteraldehyde in water. This constitutes the final tanning of the casing. The casing is withdrawn and washed. Thereafter, the casing is plasticized by passing the casing into a bath of aqueous bath containing about 3 percent glycerol and about 0.1 percent sodium bicarbonate. The casing is passed through a dryer under inflated conditions and dried by circulation of heated air over the surface of the inflated casing as is described in Example I.

The collagen casing possesses a wet process breakload strength of about 600 – 800 g and a rewet breakload strength of about 1,400 – 1,500 g.

Although the physical properties in terms of wet process breakload strength and rewet breakload strength of the casing is about the same as in the previous examples, there is the noted presence of ammonia in the processing.

What is claimed is:

1. A process for coagulating and hardening an aqueous, acid-swollen collagen slurry for making an edible sausage casing which comprises extruding said slurry through an annular die into an aqueous solution having a pH of from about 8 – 11, a temperature not exceeding about 35°C, and containing at least about 5 – 25 percent by weight of an alkali metal salt of a strong acid and from about 1 percent – 15 percent by weight of an alkali metal salt of a fugitive weak acid for a time sufficient to effect substantially complete neutralization of the acid in said collagen to coagulate and collapse the gel to form a coherent tubular collagen film.

2. The process of claim 1 wherein said solution is maintained at a temperature from about 25° – 35°C.

3. The process of claim 2 wherein said strong acid salt is a sulfate, chloride, or nitrate and said weak acid salt is a carbonate, bicarbonate, or sesquicarbonate.

4. The process of claim 3 wherein said strong acid salt is potassium or sodium sulfate.

5. The process of claim 4 wherein said alkali metal salt is sodium sulfate.

6. The process of claim 5 wherein said alkali metal weak acid salt is a sodium or potassium salt.

7. The process of claim 6 wherein said alkali metal weak acid salt is a sodium salt.

* * * * *